(12) United States Patent
Fabrell

(10) Patent No.: US 7,678,265 B2
(45) Date of Patent: Mar. 16, 2010

(54) ARRANGEMENT FOR SEPARATING ENVIRONMENTALLY HARMFUL SUBSTANCES FROM A POLLUTED MASS

(75) Inventor: Per-Åke Fabrell, Motala (SE)

(73) Assignee: Water Treatment Construction, Motala (SE)

( * ) Notice: Subject to any disclaimer, the term of this patent is extended or adjusted under 35 U.S.C. 154(b) by 853 days.

(21) Appl. No.: 10/546,279

(22) PCT Filed: Jan. 26, 2004

(86) PCT No.: PCT/SE2004/000084

§ 371 (c)(1),
(2), (4) Date: Aug. 15, 2006

(87) PCT Pub. No.: WO2004/074192

PCT Pub. Date: Sep. 2, 2004

(65) Prior Publication Data

US 2007/0012629 A1    Jan. 18, 2007

(30) Foreign Application Priority Data

Feb. 21, 2003   (SE) .................................. 0300461

(51) Int. Cl.
*C02F 11/14*   (2006.01)
(52) U.S. Cl. .............. 210/96.1; 134/109; 210/101; 210/104; 210/192; 210/196; 210/202; 210/203; 210/206; 210/257.1; 210/284
(58) Field of Classification Search .............. 210/284
See application file for complete search history.

(56) References Cited

U.S. PATENT DOCUMENTS 3,550,778 A * 12/1970 Kesselman ............... 210/167.3
3,679,052 A * 7/1972 Asper ........................ 210/777
3,774,625 A * 11/1973 Wiltrout ................... 134/104.2
4,002,566 A   1/1977 Smith
4,383,920 A * 5/1983 Muller et al. ................. 210/87
4,643,831 A * 2/1987 Fletcher ...................... 210/668

(Continued)

FOREIGN PATENT DOCUMENTS

BE    894 733    10/1982

(Continued)

OTHER PUBLICATIONS

European Search Report dated Aug. 3, 2007 for corresponding EP application. XP-002438610.

(Continued)

*Primary Examiner*—Peter A Hruskoci
(74) *Attorney, Agent, or Firm*—Harness, Dickey & Pierce

(57) ABSTRACT

The present invention relates to a process and an apparatus for separating environmentally hazardous substances, such as heavy metals and oil, from a contaminated mass, such as sewage sludge or soil from industrial sites. According to the process, an aqueous metal hydroxide solution comprising Na, K or Ca is added to the contaminated material in form of high-pressure jets, in order to disintegrate the material and provide a homogeneous mixture. Thereafter, liquid containing the hazardous substances is separated from the washed material and subsequently filtrated. The essentially pure water resulting from the filtration step may be used for producing new metal hydroxide solution to be used in the process.

15 Claims, 2 Drawing Sheets

U.S. PATENT DOCUMENTS

| | | | | |
|---|---|---|---|---|
| 4,816,222 | A | * | 3/1989 | Fagrell ........................ 422/261 |
| 5,156,335 | A | * | 10/1992 | Smith et al. .................... 239/33 |
| 5,882,429 | A | | 3/1999 | Majid et al. |
| 6,080,313 | A | * | 6/2000 | Kelada ........................ 210/631 |
| 7,160,465 | B2 | * | 1/2007 | Kirts et al. ................... 210/681 |

FOREIGN PATENT DOCUMENTS

| | | | |
|---|---|---|---|
| DE | 3303358 | | 9/1983 |
| JP | 4027486 | | 1/1992 |
| JP | 404004008 A | * | 1/1992 |
| JP | 6046751 | | 2/1994 |
| JP | 08-089944 A | | 4/1996 |
| JP | 02003071840 A | * | 3/2003 |
| RU | 2015258 C1 | | 6/1994 |
| RU | 94046089 A1 | | 9/1996 |
| RU | 2133231 C1 | | 7/1999 |
| SE | 9701815-4 | | 5/1997 |
| SE | 9800261-1 | | 3/1999 |
| SE | 9701815-4 | | 11/2001 |
| SU | 569546 A | | 8/1977 |
| WO | WO 97/44219 A1 | | 11/1997 |
| WO | WO 99/38605 A1 | | 8/1999 |

OTHER PUBLICATIONS

International Search Report mailed Apr. 29, 2004.

S.V. Yakovlev et al, Industrial Wastewater Treatment. M., Story'izdat publishers, 1979, p. 235.

N.S. Torocheshnikov et al., Environmental Protection Engineering, M., "Khimiya" publishers, 1981, p. 158-159.

* cited by examiner

ARRANGEMENT FOR SEPARATING ENVIRONMENTALLY HARMFUL SUBSTANCES FROM A POLLUTED MASS

The present invention relates to a method for separating environmentally harmful substances such as heavy metals and oils from a polluted mass such as sewage sludge or industrial soil, an arrangement for separating environmentally harmful substances such as heavy metals and oils from a polluted mass such as sewage sludge or industrial soil and a filtration system for filtering environmentally harmful substances such as heavy metals and oils out of liquid so that water with a negligible degree of contamination is obtained.

BACKGROUND OF THE INVENTION

In modern water purification plants large quantities of sludge are produced which, among other things, contains phosphorus for which plants in the natural world have a need. Phosphorus is a finite resource and it is therefore desirable to have the facility for recycling sewage sludge, for example on arable land. There is therefore a need to be able to effectively treat the sludge which contains a number of substances harmful to humans and the environment, such as heavy metals and oil. The sludge moreover has a high bacteria content, which is undesirable.

Not only sewage sludge, but other masses also need to be cleansed of the aforementioned pollutants before they can be returned to nature, for example soil from industrial land.

The purification of polluted masses using modern technology requires large quantities of water, which must be disposed of, as is also the case with industrial process water. It is also desirable, therefore, to be able to treat such water in an environmentally friendly way so that it can be reused.

OBJECT OF THE INVENTION

The object of the present invention is to provide an environmentally friendly method of effectively separating environmentally harmful substances such as heavy metal and oil from a polluted mass or liquid, so that the water can be reused and also, in the case of a polluted mass, so that the mass can be returned to nature.

This object is achieved in a method of the aforementioned type in that the invention includes a method for separating environmentally harmful substances such as heavy metals and oils from a polluted mass such as sewage sludge or industrial soil, including making up of a water-based metal hydroxide solution in which the metal belongs to the Ca, Na, K group, mixing of the mass with the water-based metal hydroxide solution, this being delivered in the form of pressurized jets. so that the mass is finely dispersed and a homogeneous mixture is obtained, centrifuging or pressing or self-draining of the homogeneous mixture obtained in the mixing step, so that liquid containing the environmentally harmful substances is separated from the essentially dry mass thus separated from the environmentally harmful substances, and filtration of the liquid containing the environmentally harmful substances so that the environmentally harmful substances are absorbed in the filter material and water with a negligible degree of contamination is obtained.

Another object of the present invention is to provide an arrangement for performing the method for separating environmentally harmful substances such as heavy metals and oils from a polluted mass such as sewage sludge or industrial soil. This object is achieved by an arrangement for separating environmentally harmful substances such as heavy metals and oils from a polluted mass such as sewage sludge or industrial soil.

Another object of the present invention is to provide a filtration system for filtering the environmentally harmful substances out of liquid. This object is achieved by a filtration system for filtering environmentally harmful substances such as heavy metals and oils out of liquid so that water with a negligible degree of contamination is obtained.

The method and the arrangement or the filtration system according to the invention moreover afford the advantage of being able to treat industrial process water, which can thus be reused.

According to one embodiment of the method and the arrangement according to the invention, the washed mass that is returned to nature is also calcium-enriched, thereby serving to counteract acidification, for example.

SUMMARY OF THE INVENTION

The method according to the invention for the environmentally friendly separation of a mass from harmful substances, such as heavy metals and oils, so that it can be returned to nature, comprises a number of different steps in which a suitable water-based metal hydroxide solution is made up and the polluted mass finely dispersed with the solution, so that a homogeneous mixture of mass and solution is obtained, followed by centrifuging, pressing or self-draining of the mixture, so that liquid containing the environmentally harmful substances is separated from the washed mass, following which the liquid is filtered through a number of natural material-based filters, so that largely clean water is obtained and can be reused in the method for preparing the water-based metal hydroxide solution afresh.

In one embodiment calcium hydroxide, $Ca(OH)_2$, is mixed with water. This is preferable since the hydroxide has the ability to bind pollutants, especially heavy metals, in the mass and the pH value of the solution in this embodiment is adjusted so that it is essentially 12.5, at which high pH value bacteria in the mass are broken down. In addition, the washed mass will be enriched with calcium.

The water that is used in the method according to the invention may be water from the existing treated water mains, water from a water tank or process water form an industrial process, for example. The last aforementioned alternative affords the advantage that with the method according to the invention the process water is also treated and can be reused.

In one embodiment the filter system comprising a bone meal filter may be used separately in order to filter environmentally harmful substances, such as heavy metals and oils, out of the liquid, so that water with a negligible degree of contamination is obtained.

DETAILED DESCRIPTION OF THE INVENTION

The method according to the invention which, as stated, comprises a combination of a number of different steps, and an arrangement used in performing these steps, will be described in more detail below in one embodiment and referring to the drawing attached, in which.

Figure 1:
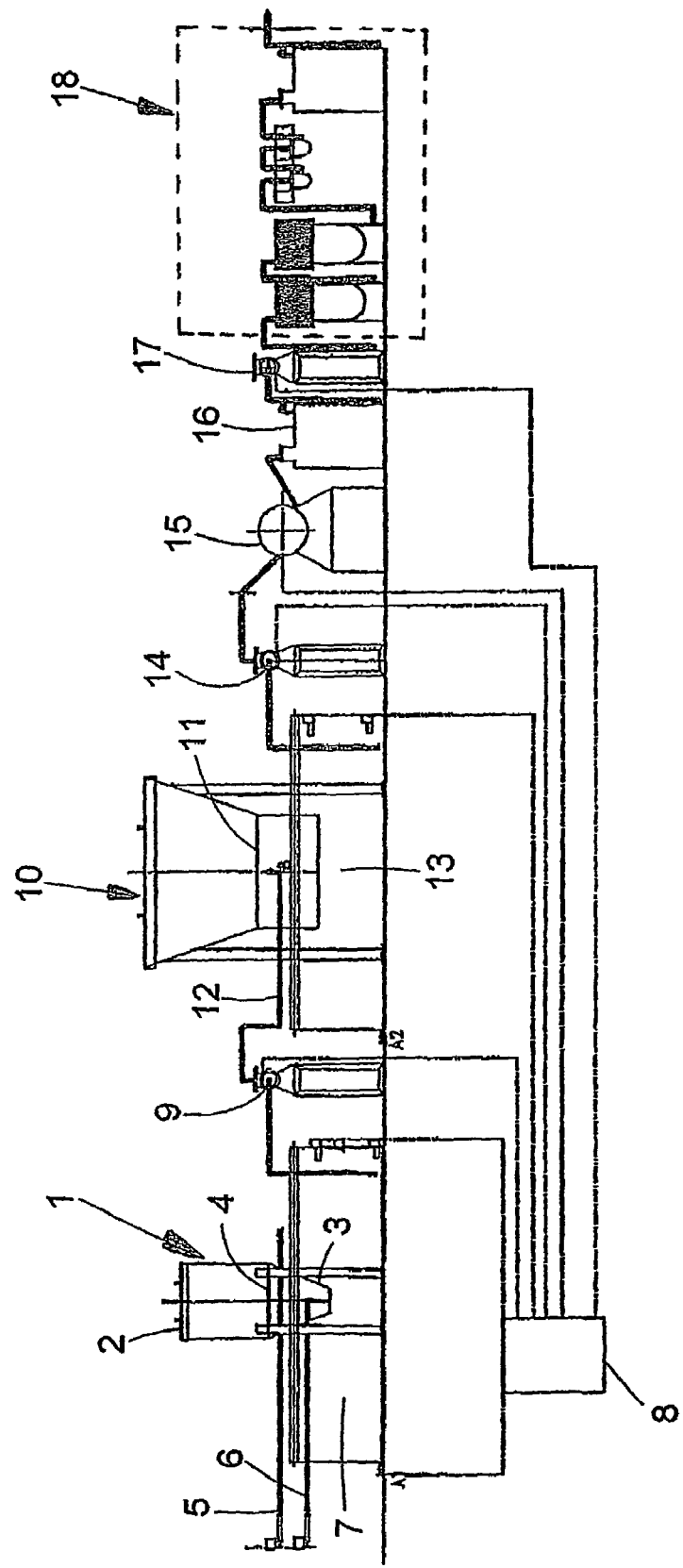
FIG. 1 shows, in schematic form, the arrangement in its entirety.

In a first step a powder suitably consisting of $Ca(OH)_2$ is prepared, ready to be turned into a fluid form. For this step a tank 1 is used, having a tightly seating cover 2 and a conical part 3, which is open at the bottom. A mesh 4 is located in the tank 1 on a level with the line of section where the tank 1 merges into the funnel 3. Inside the tank 1, the mesh 4 therefore rests on a round-bar steel cross, for example, which is supported by a number of steel holders. The mesh 4 has a calculated mesh width, which is adapted to the powder that is to be prepared. At a calculated distance below the mesh 4 there are one or more upper pipe coils, which may be of different dimensions or the same dimensions, arranged horizontally so that they follow the shape of the funnel 3. The upper pipe coils are designed to carry a flow of water, which is fed to these pipes through inlet lines 5 arranged on the side of the funnel 3. The upper pipe coils are provided with one or more spray nozzles, which may have varying capacity and be directed in different directions, provided that they are directed so that the water is sprayed up against the mesh 4.

In the first step the powder, which can be fed to the tank 1 manually or automatically through a silo (not shown), for example, rests on the mesh 4. In the latter case the cover of the tank 1 is suitably kept closed at all times, a conveyor screw, for example, being coupled to a sealed inlet on the cover 2. The powder is sprayed from beneath with a uniform and copious quantity of water, which causes the powder to be dissolved homogeneously and to drop down through the funnel 3.

The outlet from the funnel 3 is located above a collecting vessel 7, which in a second step collects the solution. A lower pipe coil is furthermore arranged at the centre of the funnel 3 and directed downwards towards the outlet of the funnel 3. This lower pipe coil is supplied with water from inlet lines 6 arranged at the side of the funnel 3 so as to be able to rapidly fill up the collecting vessel 7 with water.

Arranged in the collecting vessel 7 in accordance with the prior art is a pH meter, which is designed to adjust the pH value of the solution so that it is greater than 11.5, less than 12.8 and suitably essentially 12.5. This is achieved in that the pH meter, connected to an instrument panel 8, is calibrated automatically and controls the water supply to the upper pipe coils of the tank by way, for example, of solenoid valves arranged in the inlet lines 5. If the pH value of the solution in the collecting vessel 7 is too low, the solenoid valves to the upper pipe coils are opened, whereupon the powder resting on the mesh 4 is sprayed with water, with the result that the pH value of the solution increases. Accordingly, the water supply to the upper pipe coils is restricted if the pH value of the solution in the collecting vessel 7 is tending to increase. Accordingly, the inlet lines 6 are also provided with solenoid valves so as to be able to rapidly dilute the solution with water and reduce its pH value.

In a third step, the solution is drawn up out of the collecting vessel 7 by means of a high-capacity pump 9, suitably an eccentric screw pump, which is arranged in the collecting vessel 7. The pump 9 is automatically controlled by way of level sensors for a maximum or minimum level in the collecting vessel 7. These level sensors are also coupled to solenoid valves arranged in the inlet lines 5, 6 to the lower pipe coil, in order to control the quantity of solution in the collecting vessel 7.

In the next step, step four, a tank 10 is used, which resembles the tank 1 and is open at the bottom. Arranged in the lower part of this tank 10 is a grid 11, on which rests a polluted pass that is to be washed and the mesh width of which is adapted to the mass, which in the embodiment consists of sewage sludge. The grid 11 in turn rests, for example, on a structure of transverse flat irons welded together in a square, the structure being strong enough for the grid 11 to be capable of carrying large quantities of sewage sludge. By means of the pump 9, the solution drawn up from the collecting vessel 7 is sprayed, via a pipe line 12 and at high pressure, through the polluted sewage sludge. When the solution is sprayed through the sewage sludge the latter is finely dispersed and in this step the sewage sludge becomes odourless in that any bacteria concentration is broken down owing to the high pH value. The homogeneous mixture of sludge and solution falls down and is then collected in a second collecting vessel 13, which is arranged below the tank 10.

In a fifth step the homogeneous mixture in the second collecting vessel 13 is continuously sucked up by a second pump 14, which is also suitably an eccentric screw pump arranged in the collecting vessel 13, the mixture being conveyed to a centrifuging installation 15, pressing installation or draining installation. This collecting vessel 13 is also provided with level sensors for maximum and minimum levels in the collecting vessel 13, these being coupled to the second pump 14.

In a sixth step the sludge is separated from the liquid by centrifuging, pressing or self-draining.

In the example according to FIG. 1 this separation is performed in the centrifuging installation 15. A large proportion of the pollutants (more than 98% by weight) originally present in the polluted sewage sludge are entrained with the liquid, which is collected in a buffer storage tank 16. For example, heavy metals, which are bound to the hydroxide in the original solution. Thus after centrifuging in the centrifuging installation 15, a washed sludge is obtained, which is also calcium-enriched by the calcium in the original solution and can thereafter be returned to nature.

An example of an arrangement for separating sludge from liquid by pressing uses a belt press familiar to the person skilled in the art. Using such a press the liquid is gently separated from the sludge. In this case, too, the pollutants are dispersed to the liquid phase.

An example of a installation for separating sludge from liquid by self-draining uses a collecting well (collecting vessel), which has an upper chamber and a lower chamber. A mesh is arranged between the upper and lower chambers. Sludge is separated from liquid by delivering the mixture with sludge to the upper chamber, the mixture then being allowed to drain of its own accord, so that the liquid is separated off and collected in the lower chamber.

In a seventh step, the liquid is fed out of the buffer storage tank 16 by means of a pump 17 to a filtration system 18. In the filtration system 18 according to FIG. 2, the liquid first passes through a particle filter 19, for example a cotton particle filter of approximately 20 micron. For example, in order to collect larger particles. From there the liquid continues through a charcoal filter 20, composed of activated charcoal, which absorbs the heavy metals in the liquid, which passes on through a pressure filter 21. In the preferred embodiment the pressure filter 21 consists of wood fibre products and activated charcoal, which absorb oils and any residual heavy metals. A sand filter 22 absorbs residual particles in the liquid before this, now largely clean, passes through a final particle filter 23, this also preferably being a cotton particle filter. The filters containing pollutants are disposed of whilst largely clean water is collected in a water tank 24 and can then be returned to the inlet lines 5 and 6 in order to produce fresh calcium hydroxide solution or be reused as process water in the industry.

An example of a filtration system comprises a filter with bone meal. Experiments aimed at treating the aforementioned liquid have been conducted using a filter comprising a column (length=640 mm, inside diameter=33 mm) packed with bone meal particles (volume=550 cm$^3$), which have been sieved in order to obtain the required particle size. The particle size was selected so that when filtering the pressure would not be too high and the filtration time not too long. Using small-sized particles means that a high liquid pressure is required for filtering. Using excessively large particles prolongs the filtration time. In the experiment the screen size of the particles was 0.8 mm and the liquid retention time in the filter material was 8 minutes with a liquid flow of 69 ml/min. The result was a reduction in the chromium, cadmium, lead and mercury content of the liquid separated from the sludge of more than 99% by weight compared to the concentration before filtering (0.4-10 mg/ml). In a further experiment the screen size of the particles was 1 mm, which gave a similar result to that above.

Figure 2:
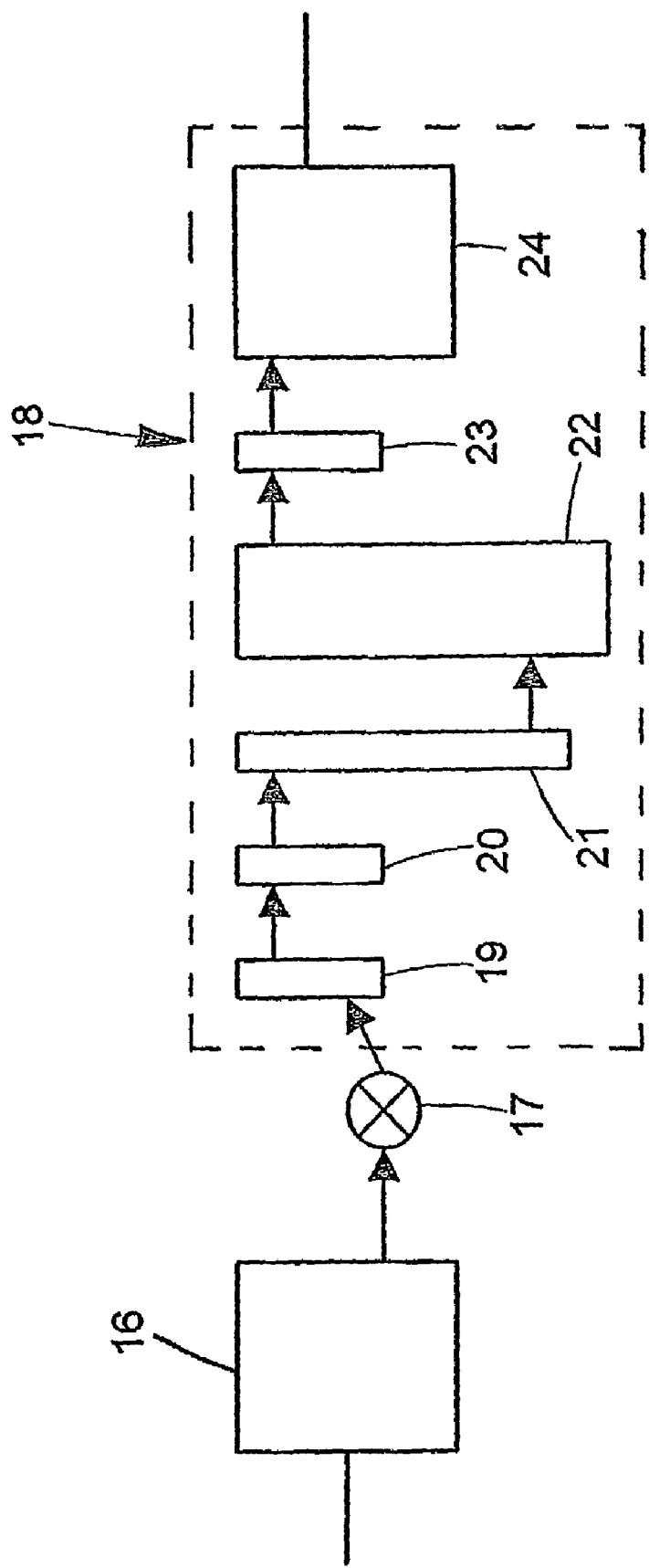
FIG. 2 shows an inset, more detailed schematic representation of the filtration system.

In an example of a filter system comprising a bone meal filter, the liquid first passes through the bone meal filter followed by the filter system 18 according to FIG. 2 described above. The bone meal filter comprises a tank, which is filled with a layer of wood fibre products (e.g. bark) and on top of this a layer of bone meal or multiple layers of bone meal, each layer of bone meal being of a different thickness. In filtering, the liquid is fed into the bottom of the tank and first passes through the layer of wood fibre products, in order to separate off oil products, for example, and then through the bone meal layer and on through the filtration system.

In one embodiment according to the invention it is possible to use just one filter system (18) comprising the bone meal filter as described above in order to filter environmentally harmful substances, such as heavy metals and oils out of the liquid, so that water with a negligible degree of contamination is obtained. Examples of liquids that can be treated in this way are industrial process water and soak water.

The method and the arrangement are not confined to the preparation of a solution of $Ca(OH)_2$ and water in the first step of the process, NaOH and KOH also permitting an effective washing of a mass, for example an industrial soil containing environmentally harmful substances such as heavy metals and oil.

The invention claimed is:

1. Arrangement for separating environmentally harmful substances from a polluted mass, the arrangement comprising:
    a first tank, provided with an opening, for a metal hydroxide with an inlet line for water opening into the first tank,
    a first collecting vessel towards which the opening of the first tank is directed and which is designed to receive a water-based metal hydroxide solution,
    a second tank provided with an opening and grid designed to receive a polluted mass,
    a pump operatively connected to the first collecting vessel, the pump being designed to pump the water-based metal hydroxide solution from the collecting vessel to the tank and there under high pressure to spray jets of the solution against the mass on the grid, so that the mass is finely dispersed and mixed with the solution to form a homogeneous mixture,
    a second collecting vessel towards which the opening of the second tank is directed,
    at least one of a centrifuge, a pressing arrangement, and a self-draining arrangement designed to separate liquid containing the environmentally harmful substances from the homogeneous mixture, and
    a filtration system connected to the at least one centrifuge, pressing arrangement, and self-draining arrangement, the filtration system being designed to filter the liquid containing environmentally harmful substances so that water with a negligible degree of contamination is obtained.

2. Arrangement according to claim 1, wherein the first collecting vessel is provided with level sensors.

3. Arrangement according to claim 1, wherein the first collecting vessel is provided with a pH meter.

4. Arrangement according to claim 1, wherein the inlet line is provided with a controllable valve.

5. Arrangement according to claim 1, wherein the pressing arrangement is a belt press.

6. Arrangement according to claim 1, wherein the filtration system comprises a filter with bone meal particles.

7. Arrangement according to claim 6, wherein a screen size of the bone meal particles is at least 0.8 mm.

8. Arrangement according to claim 1, wherein the filtration system comprises a particle filter, a charcoal filter, a pressure filter and a sand filter in series.

9. Arrangement according to claim 1, wherein the filtration system comprises a water tank.

10. Arrangement according to claim 9, wherein the water tank is connected to the inlet line.

11. Arrangement according to claim 1, wherein the filtration system comprises a filter with bone meal particles and a water tank to collect filtered water.

12. Arrangement according to claim 11, wherein a screen size of the bone meal particles is at least 0.8 mm.

13. Arrangement according to claim 11, further comprising a particle filter, a charcoal filter, a pressure filter and a sand filter in series.

14. Arrangement according to claim 1, wherein the polluted mass is at least one of sewage sludge and industrial soil.

15. Arrangement according to claim 1, wherein the environmentally harmful substance is at least one of a heavy metal and oil.

* * * * *

UNITED STATES PATENT AND TRADEMARK OFFICE
CERTIFICATE OF CORRECTION

PATENT NO. : 7,678,265 B2
APPLICATION NO. : 10/546279
DATED : March 16, 2010
INVENTOR(S) : Per-Ake Fagrell It is certified that error appears in the above-identified patent and that said Letters Patent is hereby corrected as shown below:

On the cover page of the issued patent, please correct the last name of the inventor as follows:

(12) United States Patent
     Fagrell

(75) Inventor: Per-Ake Fagrell, Motala (SE)

Signed and Sealed this
Thirteenth Day of March, 2012

David J. Kappos
*Director of the United States Patent and Trademark Office*